United States Patent
Bender et al.

(10) Patent No.: US 9,346,246 B2
(45) Date of Patent: May 24, 2016

(54) MULTI-LAYER FILMS HAVING IMPROVED SEALING PROPERTIES

(75) Inventors: Eric W. Bender, Fairport, NY (US); George F. Cretekos, Farmington, NY (US)

(73) Assignee: JINDAL FILMS AMERICAS LLC, Macedon, NY (US)

( * ) Notice: Subject to any disclaimer, the term of this patent is extended or adjusted under 35 U.S.C. 154(b) by 677 days.

(21) Appl. No.: 13/821,092

(22) PCT Filed: Aug. 12, 2011

(86) PCT No.: PCT/US2011/047551
§ 371 (c)(1),
(2), (4) Date: Apr. 12, 2013

(87) PCT Pub. No.: WO2012/039856
PCT Pub. Date: Mar. 29, 2012

(65) Prior Publication Data
US 2013/0212983 A1    Aug. 22, 2013

Related U.S. Application Data

(60) Provisional application No. 61/384,526, filed on Sep. 20, 2010.

(51) Int. Cl.
| | |
|---|---|
| B65D 75/00 | (2006.01) |
| B32B 27/08 | (2006.01) |
| B32B 27/32 | (2006.01) |
| B65D 75/26 | (2006.01) |
| B32B 3/00 | (2006.01) |
| B32B 1/02 | (2006.01) |

(52) U.S. Cl.
CPC . *B32B 27/08* (2013.01); *B32B 1/02* (2013.01); *B32B 3/00* (2013.01); *B32B 27/32* (2013.01); *B65D 75/00* (2013.01); *B65D 75/26* (2013.01); *B32B 2250/242* (2013.01); *B32B 2255/205* (2013.01); *B32B 2270/00* (2013.01); *B32B 2307/31* (2013.01); *B32B 2307/746* (2013.01); *B32B 2439/46* (2013.01); *Y10T 428/1334* (2015.01); *Y10T 428/24355* (2015.01); *Y10T 428/31855* (2015.04)

(58) Field of Classification Search
CPC .......... B32B 27/32; B32B 27/08; B32B 3/00; B32B 2250/242; B32B 2255/205; B32B 2307/31; B65D 75/26; B65D 75/00

USPC .......... 53/450, 545–555; 428/141, 35.2, 461, 428/500, 515
See application file for complete search history.

(56) References Cited

U.S. PATENT DOCUMENTS

| | | | | |
|---|---|---|---|---|
| 5,326,625 A | * | 7/1994 | Schuhmann et al. ... | B32B 27/32 428/215 |
| 5,411,788 A | * | 5/1995 | Hyde et al. .............. | B29C 59/04 428/174 |
| 6,410,132 B1 | * | 6/2002 | Peiffer et al. ........... | B32B 27/32 264/210.7 |
| 6,495,266 B1 | * | 12/2002 | Migliorini ............... | B32B 27/32 264/173.14 |
| 6,534,153 B1 | * | 3/2003 | Chu et al. ................ | B32B 27/32 264/173.15 |
| 6,551,687 B1 | * | 4/2003 | Sato et al. ............... | B32B 27/08 428/141 |
| 6,663,940 B1 | * | 12/2003 | Osame et al. ........... | B32B 27/32 428/141 |
| 6,863,964 B2 | * | 3/2005 | Migliorini et al. ...... | B32B 27/08 427/569 |
| 8,048,532 B2 | * | 11/2011 | Urbain et al. ........... | B32B 27/32 428/457 |
| 2002/0182391 A1 | * | 12/2002 | Migliorini et al. ...... | B32B 27/08 428/216 |
| 2005/0142367 A1 | | 6/2005 | Su et al. | |
| 2007/0082154 A1 | * | 4/2007 | Ambroise et al. ...... | B32B 27/32 428/35.7 |
| 2011/0083796 A1 | * | 4/2011 | Sheppard et al. ....... | B32B 27/32 156/213 |

FOREIGN PATENT DOCUMENTS

| | | |
|---|---|---|
| WO | WO 02/068190 | 9/2002 |
| WO | WO 2005/097492 | 10/2005 |
| WO | WO 2010/008696 | 1/2010 |
| WO | WO 2010/033276 | 3/2010 |

* cited by examiner

Primary Examiner — Stephen F Gerrity

(57) ABSTRACT

Multi-layer laminated structures are disclosed. Such structures include a multi-layer polymeric film having a Layer A that includes at least one polymer and a polymeric sealant layer adjacent to Layer A. The sealant layer has a surface roughness, Ra>5.0 and a Peak Count Value, Pc>50.0. The multi-layer laminated structures also include a substrate in surface contact with the multi-layer polymeric film, typically opposite the sealant layer. Such structures have a top seal and/or side seal of the polymeric sealant layer to itself has a seal strength of >5.00×10² grams/inch at 177° C. The multi-layer films may be transparent, contain a cavitating agent, or are pigmented to form an opaque film. Also, the multi-layer film may be metallized or coated with a barrier coating.

13 Claims, No Drawings

MULTI-LAYER FILMS HAVING IMPROVED SEALING PROPERTIES

CROSS REFERENCE TO RELATED APPLICATIONS

This application is a national stage filing of International Patent Cooperation Treaty Application No. PCT/US2011/047551, filed Aug. 12, 2011, which claims priority from U.S. Ser. No. 61/384,526, filed Sep. 20, 2010, the disclosure of which is fully incorporated herein by reference.

FIELD

Disclosed herein are heat-sealable, multi-layer polymeric films having improved sealing properties. More specifically, this invention relates to such multi-layer polymeric films that include a polymeric sealant layer comprising a blend of incompatible polymers.

BACKGROUND

Polypropylene-based multi-layer films are widely used in packaging applications, such as pouches for dry food mixes, pet foods, snack foods, and seeds. Such multi-layer films must have the ability to form reliable hermetic seals at relatively low temperature and, in some instances, the film must do so in the presence of contamination in the seal region, from the contents of the pouches.

Opaque, matte, multi-layer polypropylene film having at least one matte surface which includes at least one base layer and at least one interlayer and an outer layer applied to this interlayer, where the interlayer is a blend of particular olefin polymers and an HDPE or a blend thereof are known.

Multi-layer films providing improved hermetic sealing to packages manufactured in a high speed packaging apparatus wherein the sealant layer provides compliance and adhesivity to the completed seal are also known. In other multi-layer films, improved hermetic compliance and adhesivity functions are provided by separate layers.

Other multi-layer polyolefin films for packaging applications include a heat-sealable surface layer formed of a syndiotactic propylene polymer effective to produce a heat seal with itself at a sealing temperature of less than 230° F. (110° C.) are also known.

Other heat sealable packaging films are laminated structures. The first film comprises at least an ethylene/alpha-olefin copolymer outer first film layer while a second film provides non-heat-shrinkable oxygen barrier. Improved sealing properties have also been achieved in films wherein a soft polymer is blended in both the core layer and a tie layer. Core layers that include a softening additive blended in a core layer to improve compliance of the core layer with the sealable layer in hermetic sealing applications are also known. Some films show improved hermeticity without necessarily, substantially improved minimum seal strength.

Though each of the above films represents a variety of improvements related to packaging films, none of the above films combine desired improvements in processability, seal strength, impact strength, hermeticity, durability, and wide seal ranges for some of today's challenging packaging operations. For example, oriented polypropylene-based films that contain a soft compliant layer create manufacturing problems in the winding operation after orientation and are prone to blocking with the other surface of the film. Such a film will also have a high coefficient of friction (COF), which can cause issues feeding properly through a packaging machine.

One known way to resolve the winding, blocking, and COF issues is to use polydialkylsiloxane having a viscosity of 10,000 to 2,000,000 cSt. However, at the levels needed to be effective, there is excessive transfer of the siloxane from the sealant surface onto the opposite surface of the film, typically metal, which results in poor bond strengths in extrusion laminations. Another way to resolve the blocking issues is to use a matte resin in the tie layer (between the core and sealant layer) of the product; however, the COF is still too high, which can cause issues feeding properly through a packaging machine. Another way to resolve blocking issues and reduce the COF is to eliminate the impact copolymer in the tie layer; however, the seal strength of the film will be poor.

None of the above films combine desired improvements in processability, seal strength, durability, hot tack, and wide seal ranges needed for some of today's challenging packaging operations. In particular, a need exists for a multi-layer film that has both good sealing properties and increased surface roughness so as to not be dependent on high loading levels of slip additives. Such a film has the opportunity to replace other packaging substrates, such as paper, foil, and polyethylene laminations in many packaging applications, such as with dry-particulate foods.

SUMMARY

In one aspect, the present disclosure relates to a multi-layer laminated structure having a matte sealant surface. The multi-layer laminated structure has a matte sealant surface due to a blend of incompatible polymers in the polymeric sealant layer. The incompatible blend in the polymeric sealant layer increases the surface roughness of the sealant skin, which in turn, reduces the intimate contact between the film layers when in roll form. Thus, when the film is in roll form, air may be trapped between the two outer layers, such as in one form, between the sealant skin layer and the metallizable skin layer, both before and after aluminum is vacuum-deposited onto that surface. In some forms, this may aid in improving winding, reducing metallized roll blocking, and also aids in improving the multi-layer film's metallized barrier properties by reducing pin holes caused by anti-block scratches and spot blocking.

Multi-layer laminated structures disclosed herein are designed to address such needs to improve utility in packaging applications. Thus, in one form, embodiments of the invention provide a multi-layer laminated structure, comprising: (a) a multi-layer polymeric film; and (b) a substrate in surface contact with the multi-layer polymeric film. The multi-layer polymeric films comprises: i) a core layer having a first surface and a second surface, the core layer comprising a core polymer; ii) a first polymeric tie layer having a first surface and a second surface, the second surface of the first tie layer adjacent the first surface of the core layer; and iii) a polymeric sealant layer adjacent the first surface of the first tie layer, the sealant layer having a surface roughness, Ra>5.0 and a Peak Count Value, Pc>50.0. When sealed, such structures are capable of providing a top seal and/or side seal of the polymeric sealant layer to itself has a seal strength of >5.00× $10^2$ grams/inch at 177° C.

In another form, embodiments of the invention provide a multi-layer laminated structure, comprising: (a) a multi-layer polymeric film; and b) a substrate in surface contact with the multi-layer polymeric film, wherein the multi-layer polymeric film comprises i) a core layer having a first surface and a second surface, the core layer comprising a core polymer; ii) a first tie layer having a first surface and a second surface, the second surface of the first tie layer adjacent the first surface of the core layer, the first tie layer comprising a soft polymer; and iii) a sealant layer adjacent the first surface of the first tie layer, the sealant layer comprising antiblock particles and a blend of from about 25% to about 50% polyethylene and from about 75% to about 50% ethylene-propylene-butylene terpolymer, wherein a top seal and/or side seal of the sealant layer to itself has a seal strength of greater than about $20.0 \times 10^2$ grams per inch at 177° C.

In another form, embodiments of the invention provide a method of preparing a multi-layer laminated structure capable of providing a top seal and/or side seal formed by sealing a sealant layer to itself has a seal strength of $>20.0 \times 10^2$ grams per inch at 177° C., the method comprising: (a) forming a multi-layer polymeric film by co-extruding: i) a core layer having a first surface and a second surface, the core layer comprising a core polymer; ii) a first tie layer having a first surface and a second surface, the second surface of the first tie layer adjacent the first surface of the core layer, the first tie layer comprising a soft polymer; and iii) a sealant layer adjacent the first surface of the first tie layer, the sealant layer comprising an anti-blocking agent and having a surface roughness, Ra>5.0 and a Peak Count Value, Pc>50; and (b) laminating a substrate to the multi-layer film.

In yet another form, embodiments of the invention provide a method of using a multi-layer film, comprising: (a) enclosing a product or article within at least a portion of a co-extruded film, wherein the co-extruded film comprises: (i) a core layer having a first surface and a second surface, the core layer comprising a core polymer, (ii) a first polymeric tie layer having a first surface and a second surface, the second surface of the first tie layer adjacent the first surface of the core layer, the first tie layer, and (iii) a polymeric sealant layer adjacent the first surface of the first tie layer, the sealant layer having a 45° surface gloss of ≤75%; (b) engaging a first portion of the sealant skin layer with a second portion of the sealant skin layer at a seal layer region; and (c) applying pressure and heat at the seal region to cause the first portion to engage with the second portion to create at least a top seal and/or side seal having a seal strength of greater than about $20.0 \times 10^2$ grams per inch at 177° C.

These and other features, aspects, and advantages of the present disclosure will become better understood with regard to the following description and appended claims.

DETAILED DESCRIPTION

Selected forms will now be described in more detail, but this description is not meant to foreclose other forms within the broader scope of this disclosure.

Each of the following terms written in singular grammatical form: "a," "an," and "the," as used herein, may also refer to, and encompass, a plurality of the stated entity or object, unless otherwise specifically defined or stated herein, or, unless the context clearly dictates otherwise.

Each of the following terms: "includes," "including," "has," "having," "comprises," and "comprising," and, their linguistic or grammatical variants, derivatives, and/or conjugates, as used herein, means "including, but not limited to."

Throughout the illustrative description, the examples, and the appended claims, a numerical value of a parameter, feature, object, or dimension, may be stated or described in terms of a numerical range format. It is to be fully understood that the stated numerical range format is provided for illustrating implementation of the forms disclosed herein, and is not to be understood or construed as inflexibly limiting the scope of the forms disclosed herein.

It is to be understood that the various forms disclosed herein are not limited in their application to the details of the order or sequence, and number, of steps or procedures, and sub-steps or sub-procedures, of operation or implementation of forms of the methods or to the details of type, composition, construction, arrangement, and order of the component layers thereof, set forth in the following illustrative description and examples, unless otherwise specifically stated herein. The multi-layer films and methods disclosed herein can be practiced or implemented according to various other alternative forms and in various other alternative ways.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules, such as copolymer, terpolymer, etc., and encompasses individual polymer components and/or reactor blends.

The term "polyolefin" means a polymer containing recurring units derived from olefin, e.g., poly-α olefin such as polypropylene and/or polyethylene.

"Polypropylene" means a polyolefin containing recurring propylene-derived units, e.g., polypropylene homopolymer and/or polypropylene copolymer wherein at least 50%, preferably 85%, (by number) of the recurring units are derived from propylene monomer.

As used herein, the term "isotactic" is defined as polymeric stereoregularity having at least 40% isotactic pentads of methyl groups derived from propylene according to analysis by 13C-NMR.

As used herein, "stereoregular" is defined to mean that the predominant number, e.g., greater than 80%, of the propylene units in the polypropylene or in the polypropylene continuous phase of a blend, such as impact copolymer exclusive of any other monomer such as ethylene, has the same 1,2 insertion and the stereochemical orientation of the pendant methyl group is the same, either meso or racemic.

"Polyethylene" means a polyolefin containing recurring ethylene-derived units, e.g., polyethylene homopolymer and/or polyethylene copolymer wherein at least 50%, preferably 85%, (by number) of the recurring units are ethylene monomer.

"Copolymer" means a polymer containing recurring units derived from at least two different monomers, preferably, e.g., olefins such as ethylene, propylene, butenes, etc. Thus, a propylene copolymer or propylene-based polymer contains at least two different monomers wherein >50%, preferably >85%, (by number) of the recurring units are derived from propylene monomer.

"Terpolymer" means a polymer containing recurring units derived from at least three different monomers, preferably, e.g., olefins such as ethylene, propylene, butenes, etc. Thus, a propylene terpolymer or propylene-based terpolymer contains at least three different monomers wherein >50%, preferably >85%, (by number) of the recurring units are derived from propylene monomer.

As used herein, "intermediate" is defined as the position of one layer of the multi-layer film wherein said layer lies between two other identified layers. In some forms, the intermediate layer may be in direct contact with either or both of the two identified layers. In other forms, additional layers may also be present between the intermediate layer and either or both of the two identified layers.

As used herein, "substantially free" is defined to mean that the referenced film layer is largely, but not necessarily wholly, absent a particular component. In some forms, the layer is completely free of the particular component; however, in other forms, small amounts of the component may be present within the referenced layer as a result of standard manufacturing methods, including recycling of film scraps and edge trim during processing.

The terms "compliant" or "compliance" as used herein refer to the ability of the sealed area of film to deform or conform within the sealing jaws during sealing operations. The sealed area includes an outer layer and may additionally include an adjacent layer to the outer layer. These terms additionally refer to the ability to elastically and/or plastically deform and diffuse stress throughout the multi-layer film substrate subsequent to sealing operations when the seal is subjected to stress.

The terms "incompatible blend" and "matte resin" refer to a composition having two or more morphological phases in the same state. For example, a blend of two polymers, where one polymer forms discrete packets dispersed in a matrix of another polymer is said to be a heterogeneous, or incompatible, blend in the solid state. Also, a "heterogeneous blend" is defined to include co-continuous blends where the blend components are separately visible, but it is unclear which is the continuous phase and which is the discontinuous phase. Such morphology is determined using scanning electron microscopy (SEM) or atomic force microscopy (AFM). In the event the SEM and AFM provide different data, then the AFM data are used. By "continuous phase" is meant the matrix phase in a heterogeneous blend. By "discontinuous phase" is meant the dispersed phase in a heterogeneous blend. The term "matte resin" generally provides a film having a matte finish. A matte finish can be described as relatively high haze and/or as relatively low gloss. Haze is measured by ASTM D-1003. Gloss is measured by ASTM-D-523 at an angle of 45 degrees.

Disclosed herein is an improved multi-layer laminated structure having improved sealing properties, comprising: a core layer having a first surface and a second surface, the core layer comprising a core polymer, a first polymeric tie layer having a first surface and a second surface, the second surface of the first tie layer adjacent the first surface of the core layer and a polymeric sealant layer adjacent the first surface of the first tie layer, the sealant layer having a 45 degree gloss ≤75%, wherein a top seal and/or side seal of the polymeric sealant layer to itself has a seal strength of greater than about $20.0 \times 10^2$ grams/inch at 177° C.

In one form, the polymeric sealant layer may comprise a matte resin or a blend of polyethylene and matte resin blend or a blend of polyethylene and ethylene propylene butene terpolymer (EPB) to optimize the roughness, seal strength, and seal range, as well as lower the coefficient of friction (COF). Optionally, antiblock particles may be added to the polymeric sealant layer to further reduce the COF. In one form, a fluoropolymer may be added to reduce or eliminate die lip build up.

In the multi-layer films of the laminated structures disclosed herein, one or more soft polymers may be blended or provided into one or more film layers to facilitate improved seal strengths and in some forms, reduced sealing temperatures, and wide seal ranges. The multi-layer films may comprise a soft polymer as the sole or majority component of the tie layer. The soft polymer may be considered a softening or compliance-enhancing additive. A polymeric sealant layer is provided on the surface of the tie layer opposite the core layer. The presence of the soft polymer permits each of at least a core layer, a tie layer, and a polymeric sealant layer to act synergistically with each other to dissipate stress throughout the layers. When force is applied to a seal of the polymeric sealant layer to itself, the film diffuses or dissipates the stress throughout each of the three layers through improved plastic deformation or compliance, instead of leaving the stress concentrated in the seal layer. A seal that dissipates the stress may generally facilitate a stronger seal than the same film having a concentrated stress region.

It is contemplated that further seal strength benefit may be realized in the seal area through improved bonding interaction between the core, tie, and sealant layers. This improved bonding is a result of improved flowability of the soft polymer, both within the layer comprising the soft polymer and at the interface with the layers adjacent to soft-polymer-containing layer, resulting in improved interlayer molecular intermingling at the layer interfaces. Benefits of the improved flowability manifest film improvement during both co-extrusion of the multi-layer film and then again during sealing operations.

As a result of the improved elasticity or compliance, the films according to this invention may also provide improvements in seal strength integrity and improved hermetic sealing, particularly in the more leak-prone folds, creases, and seams in the seal area, due to the improved film conformability during sealing.

In one form, the multi-layer film is a three-layer structure comprising a core layer, a first tie layer, and a sealable skin layer. In another form, the multi-layer film is a four-layer structure which further comprises an outer layer on a surface of the core layer opposite the first tie layer and sealable layer.

In still another form, the multi-layer film is a film having a five-layer structure comprising a core layer, first and second tie layers, a sealant layer, and an outer skin layer. The second tie layer is positioned between the core layer and the outer layer.

In still yet another form, the multi-layer film is a cavitated, white or opaque film due to the addition of a cavitating agent to the core layer and/or pigments such as titanium dioxide to one or more of the layers. In any form of this invention, the multi-layer films may be used stand-alone as monoweb packaging films, laminated to other films or substrates, and formed into a package or pouch to enclose or contain a product or material.

The minimum seal temperature of the multi-layer films of this invention are preferably less than or equal to about 200° F. (93° C.), more preferably the minimum seal temperature is less than or equal to about 180° F. (82.2° C.), even more preferably the minimum seal temperature is less than or equal to about 176° F. (80.0° C.), and most preferably the minimum seal temperature is less than or equal to about 170° F. (76.7° C.), when a seal is formed by a crimp sealer of 200 gram weight, 20 psi pressure, and 0.75 sec. dwell time of the sealant layer to itself. Such minimum sealing temperatures are determined in accordance with methods described herein below.

The seal strength of the multi-layer films disclosed herein is greater than about 500 grams/inch; preferably, the seal strength is greater than about 1000 grams/inch; still more preferably, greater than about 1500 grams/inch, still more preferably, greater than about 2000 grams/inch, and most preferably, greater than about 2500 grams/inch, when seals are formed using a crimp sealer at a temperature of at least 190° F. (87.8° C.) such seal strength determined in accordance with the methods described herein (i.e., using Bartelt machine). The films will preferably have a seal strength of greater than about 600 grams per inch for a seal formed on a crimp sealer at a temperature of at least 200° F. (93.3° C.). In some forms, the films according to this invention will have a seal strength of at least 1000 grams per inch when sealed at a temperature of at least 200° F. (93.3° C.).

The detailed description below is given solely for the purpose of illustrating certain forms of the invention and should not be taken as limiting the present inventive concepts to these specific forms. To the extent that this description is specific to a particular form, this is for purposes of illustration only and should not be taken as limiting the present inventive concepts to these specific forms.

Matte Resin Compositions

As indicated above, the polymeric sealant layer may comprise a blend of one or more soft polymers and one or more incompatible polymers to optimize the roughness, seal strength, and seal range, as well as lower the coefficient of friction (COF).

Materials useful in the polymeric sealant layer disclosed herein include, but are not limited to, ethylene propylene copolymers and blends of incompatible polymers, such as ethylene propylene random copolymers, polypropylene homopolymers, high density polyethylene ("HDPE"), ethylene vinyl acetate ("EVA"), ethylene methyl acrylate ("EMA"), ethylene ethyl acrylate ("EEA"), ethylene propylene butene terpolymers ("EPB"), propylene butene copolymer ("PB"), and combinations thereof.

Preferred matte resins are chosen in part because they contain polymers which contribute to the sealability of the film. For example, in the preferred forms, the matte resin is a blend of incompatible polymers wherein at least one of the polymers in the blend has good sealing properties. Thus, in preferred forms at least one polymer of the matte resin has a reduced melting temperature as compared to more crystalline polymers. This allows the matte resin to contribute to the matte surface of the multi-layer film and also to the sealability of the film. In particularly preferred forms, the matte resin comprises an EPB terpolymer.

The matte resin can be a blend of high density polyethylene resins and a predominately propylene based polymer (homopolymer, copolymer, or terpolymer). The matte resin may include blends of PE with different densities; such as, for example, a blend of HDPE with a density of 0.95 g/cm$^3$ or greater and a lower density polyethylene with a density of 0.92 g/cm$^3$ or less.

Certain forms may include blending a low molecular weight copolymer and/or terpolymer with a high molecular weight copolymer and/or terpolymer in the matte resin. For example, the matte resin may be formed by providing a blend of at least one high molecular weight, phase-separating component, and at least one low molecular weight phase-separating component, with high molecular weight high density polyethylene (HMW HDPE). The ratio of high molecular weight copolymer and/or terpolymer to low molecular weight copolymer and/or terpolymer, may be in the range of 25:75 to 75:25 or 50:50 high molecular weight component to low molecular component.

Examples of suitable high molecular weight copolymers and/or terpolymers include, but are not limited to, copolymers and terpolymers having a melt flow rate of equal to or less than 8 dg/min, as measured by ASTM D 1236 at 230° C., such as JPC XPM 7700, JPC XPM 7790, or JPC XPM 7800 series propylene terpolymers all of which are available from Japan Polypropylene Corporation or Total 8573 available from Total Petrochemical Company. Examples of suitable low molecular weight copolymers and/or terpolymers include, but are not limited to copolymers and terpolymers having a melt flow rate of equal to or greater than 10 dg/min, such as HF3193 a propylene terpolymer, available from Japan Polypropylene Corp.

HMW HDPE polymers may have a melt index of less than 1 or less than 0.5, as measured in accordance with ASTM D1238, under a load of 2.16 kg at 190° C. The HMW HDPE may have a density in the range of about 0.940 g/cm$^3$ to about 0.970 g/cm$^3$, and a melting point of in the range of about 115° C. to about 140° C. For example, the HMW HDPE may have a density in the range of 0.95 g/cm$^3$ to 0.970 g/cm$^3$, and a melting point in the range of 120° C. to 134° C.

In another form, the matte resin may include a copolymer of ethylene and propylene and a terpolymer of ethylene, propylene, and butylene, wherein the copolymer and terpolymer may include predominantly propylene. Such copolymers or terpolymers, may contain more than 80% propylene. The ethylene polymer may include a copolymer or a blend of different kinds of ethylene polymers. For example, the ethylene polymer may be a blend of two or more ethylene polymers each having different densities. In one form, the ethylene polymer comprises at least a first ethylene polymer having a density of at least 0.91 g/cm$^3$ and a second ethylene polymer having a density, which is different from the density of the first ethylene polymer. For example, the blend may comprise high density polyethylene and low density polyethylene, or linear low density polyethylene. The ratio of the blend components may vary depending upon the polyethylene components of the blend and the desired characteristics of the layer. A blend, in which an equal proportion of each component is employed, such as a 50:50 blend, may be used.

In one form the matte resin includes a blend of at least one EPB and a polyethylene. The polyethylene may be a HDPE or may be a LDPE. In other forms, the matte resin is a blend of at least one EPB, at least one LDPE, and at least one HDPE, for example, such as a blend of 50% ethylene-propylene-butene-1 terpolymer, 40% high density polyethylene (0.95 g/cm$^3$), and 10% of a lower density polyethylene (0.92 g/cm$^3$ or less).

Soft Polymers

Acceptable soft polymers for use in the matte resin include, but are not limited to, impact copolymers or heterophasic polymer blends that typically contain from about 5.0 wt % to 25.0 wt % of an elastomeric compound to incorporate rubber-like properties to the normally rigid backbone of polypropylene-based polymers. Other heterophasic copolymers, such as those made by Basell's Catalloy™ process may contain over 25 wt % and even in excess of 50 wt % of elastomeric compound. For the exemplary Catalloy™ or impact polymers, the elastomeric component of the impact polymer may include, but are not limited to, acrylonitrile-chloroprene copolymer, acrylonitrile-isoprene copolymer, butadiene-acrylonitrile copolymer, chlorinated polyethylene, chlorosulfonated polyethylene, ethylene-ether polysulfite, ethylene-ethyl acrylate copolymer, ethylene polysulfite, ethylene-propylene copolymer, ethylene-propylene-diene terpolymer, fluoroelastomer, fluorosilicone, hexafluoropropylene-vinylidene fluoride copolymer, isobutene-isoprene copolymer, organopolysiloxane, acrylic ester-butadiene copolymer, polybutadiene, polychloroprene, polyepichlorohydrin, polyisobutene, polyisoprene, polyurethane, styrene-butadiene copolymer, styrene-chloroprene copolymer, polyethylene-butyl graft copolymer, styrene-butadiene-styrene triblock polymer, and blends thereof.

The soft polymer may be an impact copolymer (ICP) or block copolymer, particularly when used in the layer underlying the sealant layer. Propylene impact copolymers are commonly used in a variety of applications where strength and impact resistance are desired such as molded and extruded automobile parts, household appliances, luggage and furniture. Propylene homopolymers alone are often unsuitable for such applications because they are too brittle and have low impact resistance particularly at low temperature, whereas propylene impact copolymers are specifically engineered for applications such as these.

A typical propylene impact copolymer contains at least two phases or components, e.g., a homopolymer component and a copolymer component. Suitable impact copolymers are described in U.S. application Ser. No. 12/392,218, incorporated herein by reference for its disclosure related to impact copolymer compositions. The impact copolymer may also comprise three phases such as a PP/EP/PE combination with the PP continuous and a dispersed phase with EP outside and PE inside the dispersed phase particles. These components are usually produced in a sequential polymerization process wherein the homopolymer produced in a first reactor is transferred to a second reactor where copolymer is produced and incorporated within the matrix of the homopolymer component. The copolymer component has rubbery characteristics and provides the desired impact resistance, whereas the homopolymer component provides overall stiffness.

Another important feature of ICP's is the amount of amorphous polypropylene they contain. The ICP's of this invention are characterized as having low amorphous polypropylene, preferably less than 3% by weight, more preferably less than 2% by weight, even more preferably less than 1% by weight and most preferably there is no measurable amorphous polypropylene. Percent amorphous polypropylene is determined by the method described below in the test methods.

Other acceptable soft polymers comprise a PB copolymer such as Shell SRD4-141 (commercially available from Shell Chemical Company); plastomers, such as Vistamax VMX1000 or VMX3000 (commercially available from ExxonMobil Chemical); and EPB terpolymer such as Chisso XPM7800 (commercially available from Chisso Chemical Company).

The other polymer component of the exemplary heterophasic copolymers may include, for example, ethylene- and propylene-based polymers including, but not limited to, polyolefins selected from the group consisting of ethylene-propylene (EP) copolymer, ethylene-propylene-butylene (EPB) terpolymer, propylene-butylene (PB) copolymer, and blends thereof.

In addition to the exemplary heterophasic or Catalloy™ impact-type polymers, numerous other polymers or polymer blends are acceptable as the soft polymer. For example, other acceptable polymers may include block copolymers, copolymers and terpolymers including $C_2$-$C_8$ alpha-olefins, and random copolymers. The acceptable soft polymers may be the product of Ziegler-Natta or metallocene catalysis.

As used herein, the term "soft polymer" may be defined to include those homopolymers, copolymers, terpolymers, or other polymers having at least one of the following properties:

melting point temperature, "$T_m$," less than or equal to about 288° F. (142° C.);
vicat Softening Point (ASTM D1525) of less than or equal to about 221° F. (105° C.); and/or
flexural Modulus (ASTM D790) of less than or equal to about 80 kpsi.

Soft polymers will most commonly include those polymers having a flexural modulus (ASTM D790) of less than about 80 Kpsi (552 MPa). Preferably, soft polymers include those polymers having a flexural modulus of less than about 50 Kpsi (345 MPa), and for some forms and most preferably for some forms, a flexural modulus of less than about 20 Kpsi (138 MPa). In some preferred forms, the soft polymers will be a polyolefin co- or terpolymer and may have a melting point temperature $T_m$ equal to or less than about 288° F. (142° C.), more preferably equal to or less than about 248° F. (120° C.), and even more preferably for some forms, equal to or less than about 212° F. (100° C.). The soft resins may also be defined as those resins having a Vicat softening point (VSP) (ASTM D1525) of less than or equal to about 221° F. (105° C.), more preferably of less than or equal to about 176° F. (80° C.), and for some forms, most preferably of less than or equal to about 150° F. (65° C.).

Core Layer

The core layer of a multi-layered film is most commonly the thickest layer and provides the foundation of the multi-layer film. The core layer may comprise a polymer selected from propylene polymer, ethylene polymer, polypropylene, isotactic polypropylene ("iPP"), high crystallinity polypropylene ("HCPP"), ethylene-propylene copolymers, ethylene propylene random copolymer, high density polyethylene ("HDPE"), linear low density polyethylene ("LLDPE"), or syndiotactic polypropylene ("sPP"), and combinations thereof. The polymers may be produced by Ziegler-Natta catalyst, metallocene catalyst, or any other suitable means.

Polypropylene copolymers, if used in the core layer, may include one or more comonomers. Preferably the comonomer is selected from one or more of ethylene or butene. The propylene will be present in such co- or terpolymers at greater than 90 wt %. Propylene polymers contemplated will generally have a melting point of at least about 140° C., or at least 150° C. Melt flow ratios of the polypropylenes may be in the range of 0.5 g/10 min to 8 g/10 min, or 1.5 g/10 min to 5 g/10 min. Examples of commercially available propylene polymers include, but are not limited to, Total 3371 (from Total Petrochemicals Company), or PP4712 (from ExxonMobil Chemical Company).

Preferably the core layer comprises a high crystallinity polymer. A high crystallinity polymer is needed in the core layer to overcome the decrease in the multi-layer film's tensile strength due to the increased softness of the tie layer. The high crystallinity polymer enables the multi-layer film to maintain a stiffer modulus despite the softer more flexible polymers contained within the matte tie layer and sealant skin layer. An example of a suitable commercially available HCPP is Total Polypropylene 3270, available from Total Petrochemicals.

In a preferred form, the core layer comprises a HCPP. In a preferred form, the core layer comprises HCPP with an isotacticity expressed in mmmm pentads of at least 97%, more preferably of at least 97.5%, as measured by 13C-NMR.

In some forms, the core layer may be substantially free of soft polymer.

The core layer may further comprise at least one additive such as an opacifying agent, void-initiating particles, a hydrocarbon resin, or combinations thereof.

An opacifying or coloring agent may be used in the core layer, such as oxide, carbon black, aluminum, titanium dioxide ($TiO_2$), talc, and combinations thereof.

Cavitating or void-initiating particles may be added to the core layer polymer to create an opaque film. The cavitating or void-initiating additives include any suitable organic or inorganic material that is incompatible with the core layer polymer material at the temperature of biaxial orientation. Examples of suitable void-initiating particles are polybutylene teraphthalate (PBT), nylon, solid or hollow pre-formed glass spheres, metal beads or spheres, ceramic spheres, calcium carbonate, talc, chalk, or combinations thereof.

The core layer may comprise anti-static agents or migratory slip agents, such as fatty amides.

The core layer of forms of this invention preferably may have a thickness in the range of from about 10.0 μm to about 50.0 μm; more preferably from about 10.0 μm to about 25.0 μm; most preferably from about 15.0 μm to about 20.0 μm.

First Tie Layer

The first tie layer, which for the purposes of this description can be considered an outer portion of the core layer, has a first surface and a second surface, the second surface is on the first surface of the core layer and is preferably contiguous to the surface of the first surface of the core layer. The first tie layer comprises a soft polymer. In some preferred forms, the first tie layer comprises about 100 percent soft polymer by weight (100 wt %) of the first tie layer. The soft polymer of the tie layer comprises those polymers described herein as soft polymers.

The thickness of the first tie layer is not critical and is typically in the range of from about 0.06 μm to about 8.0 μm, particularly about 1.0 μm to about 6.0 μm, or about 2.0 μm to about 4.0 μm. In general, the preferred thickness of the tie layer is based on the overall film thickness, the desired stiffness, and seal properties.

Polymeric Sealant Layer

The polymeric sealant layer has a first surface and a second surface, the second surface of the sealant layer is on the first surface of the first tie layer. In preferred forms, the sealant layer is contiguous to the first tie layer. The sealant layer includes a polymer that is suitable for heat-sealing or bonding to itself when crimped between heated crimp-sealer jaws. As indicated above, the polymeric sealant layer may comprise a matte resin or a blend of polyethylene and matte resin or a blend of polyethylene and one or more incompatible polymers, such as ethylene propylene butene terpolymer (EPB), to optimize the roughness, seal strength, and seal range, as well as lower the coefficient of friction (COF).

Materials useful in the polymeric sealant layer disclosed herein include, but are not limited to, ethylene propylene copolymers and blends of incompatible polymers, such as ethylene propylene random copolymers, polypropylene homopolymers, high density polyethylene ("HDPE"), ethylene vinyl acetate ("EVA"), ethylene methyl acrylate ("EMA"), ethylene ethyl acrylate ("EEA"), ethylene propylene butene terpolymers ("EPB"), propylene butene copolymer ("PB"), and combinations thereof.

As noted above, preferred matte resins are chosen in part because they contain polymers which contribute to the sealability of the film. For example, in the preferred forms, the matte resin is a blend of incompatible polymers wherein at least one of the polymers in the blend has good sealing properties. Thus, in preferred forms at least one polymer of the matte resin has a reduced melting temperature as compared to more crystalline polymers. This allows the matte resin to contribute to the sealability of the film. In particularly preferred forms, the matte resin comprises an EPB terpolymer.

The matte resin can be a blend of high density polyethylene resins with a predominately propylene based polymer (homopolymer, copolymer or terpolymer). The matte resin may include blends of PE with different densities; such as, for example, a blend of HDPE with a density of 0.95 g/cm³ or greater and a lower density polyethylene with a density of 0.92 g/cm³ or less.

Examples of suitable copolymers and/or terpolymers include, but are not limited to, copolymers and terpolymers having a melt flow rate of equal to or less than 12 dg/min, preferably less than 8 dg/min, as measured by ASTM D 1236 at 230° C., such as JPC XPM 7700, JPC XPM 7790, or JPC XPM 7800 series propylene terpolymers, all of which are available from Japan Polypropylene Corporation or Total 8573 available from Total Petrochemical Company.

HDPE polymers may have a melt index of less than 1.0 or less than 0.5, as measured in accordance with ASTM D1238, under a load of 2.16 kg at 190° C. The HDPE may have a density in the range of about 0.940 g/cm³ to about 0.970 g/cm³, and a melting point of in the range of about 115° C. to about 140° C. For example, the HDPE may have a density in the range of 0.95 g/cm³ to 0.970 g/cm³, and a melting point in the range of 120° C. to 134° C.

The matte resin may include a copolymer of ethylene and propylene and a terpolymer of ethylene, propylene and butylene, wherein the copolymer and terpolymer may include predominantly propylene. Such copolymers or terpolymers, may contain more than 80% propylene. The ethylene polymer may include a copolymer or a blend of different kinds of ethylene polymers. For example, the ethylene polymer may be a blend of two or more ethylene polymers each having different densities. In one form, the ethylene polymer comprises at least a first ethylene polymer having a density of at least 0.91 g/cm³ and a second ethylene polymer having a density, which is different from the density of the first ethylene polymer. For example, the blend may comprise high density polyethylene and low density polyethylene, or linear low density polyethylene. The ratio of the blend components may vary depending upon the polyethylene components of the blend and the desired characteristics of the layer. A blend, in which an equal proportion of each component is employed, such as a 50:50 blend, may be used.

The matte resin may include a blend of at least one EPB and a polyethylene. The polyethylene may be a HDPE or may be a LDPE. The amount of HDPE ranges from 0 wt % to 50 wt % HDPE. In some embodiments, the lower limit of HDPE or LLDPE content is 2.0 wt %, 5.0 wt %, 10.0 wt %, 20.0 wt %, 30.0 wt %, or 40.0 wt %. In some embodiments the upper limit on the HDPE or LLDPE content is 45.0 wt %, 40.0 wt %, 30.0 wt %, 20.0 wt %, or 10.0 wt %.

As noted above, the matte resin may include, but is not limited to, the following commercially available polymer products: EP 8573, which is an EP copolymer available from Total Petrochemicals Company; JPC 7800, which is an EPB terpolymer available from Japan Polypropylene Corporation; Total EOD 97-09, which is metallocene catalyzed isotactic polypropylene sold by Total Petrochemicals Company; Equistar M6211, which is a HMW HDPE resin from Equistar Corporation; metallocene-catalyzed LLDPEs, e.g., Exceed™ polyethylenes (commercially available from ExxonMobil Chemical Company), and Equistar L5005 HDPE polyethylene resin from Equistar Company.

The thickness of the sealant layer is typically in the range of from about 0.50 μm to about 5.0 μm; preferably about 1.0 μm to about 4.0 μm; and most preferably about 1.0 μm to about 2.0 μm. In some commonly preferred film forms, the sealant layer has a thickness in the range of from about 0.5 μm to about 2 μm, about 0.5 μm to about 3 μm, or about 1 μm to about 3.5 μm. The sealant layer may also comprise processing aid additives, such as anti-blocks, anti-stats, and slip agents.

Outer Skin Layer

An outer skin layer is an optional layer and when present is provided on the opposite surface of the core layer from the sealant layer. The outer skin layer has a first surface and a second surface, the first surface of the outer skin layer is on the second surface of the core layer and may be contiguous to the second surface of the core layer or contiguous to one or more tie layers positioned between the core layer and the outer skin layer. The outer skin layer may be provided to improve the film's barrier properties, processability, printability, and compatibility for metallization, coating, and lamination to other films or substrates.

The outer skin layer comprises at least one polymer selected from the group consisting of a PE polymer, a PP polymer, an EP copolymer, an EPB terpolymer, an ethylene-vinyl alcohol (EVOH) polymer, a PB copolymer and blends thereof. Preferably, the PE polymer is high-density polyethylene, such as HDPE, such as M-6211 and HDPE M-6030 (commercially available from Equistar Chemical Company); and HD-6704.67 (commercially available from ExxonMobil Chemical Company); and preferably the PP polymer is an EP copolymer, such as Total EP 8573 (commercially available from Total Petrochemicals Company). For coating and printing functions, the outer skin layer may preferably comprise a co- or terpolymer that has been surface treated. For metallizing or barrier properties, a HDPE, PP, PB or EVOH may be preferred. A suitable EVOH copolymer is Eval G176B (commercially available from Kuraray Company Ltd. of Japan).

The thickness of the outer skin layer depends upon the intended function of the skin layer, but is typically in the range of from about 0.50 μm to about 3.5 μm; preferably from about 0.50 μm to about 2 μm; and in many forms most preferably from about 0.50 μm to about 1.5 μm. Also, in thinner film forms, the outer skin layer thickness may range from about 0.50 μm to about 1.0 μm; or from about 0.50 μm to about 0.75 μm; or is about 0.50 μm.

Second Tie Layer

In some forms of the multi-layer films invention, an optional second tie layer forms a region of the core layer that is in surface contact with the outer skin layer. Such second tie layer forms the second surface of the core layer that is contiguous to the first surface of the outer skin layer. In some preferred forms, the second tie layer is an adhesion promoting material, such as Admer AT 1179A (commercially available from Mitsui Chemicals America Inc.), a maleic anhydride modified polypropylene.

The thickness of the second tie layer is in the range of from about 1 μm to about 10 μm; preferably from about 1 μm to about 4 μm; and most preferably from about 2 μm to about 3 μm. Also, the thickness may be from about 0.5 μm to about 8 μm; or from about 1 μm to about 6 μm; or from about 1 μm to about 4 μm.

Coating

In some forms, one or more coatings, such as for barrier, printing and/or processing, may be applied to the outer skin layer of the multi-layer films disclosed herein. Such coatings may include acrylic polymers, such as ethylene acrylic acid (EAA), ethylene methyl acrylate copolymers (EMA), poly-vinylidene chloride (PVDC), poly(vinyl)alcohol (PVOH) and ethylene (vinyl)alcohol EVOH. The coatings are preferably applied by an emulsion coating technique, but may also be applied by co-extrusion and/or lamination.

The PVDC coatings that are suitable for use with the multi-layer films of this invention are any of the known PVDC compositions heretofore employed as coatings in film manufacturing operations, e.g., any of the PVDC materials described in U.S. Pat. Nos. 4,214,039; 4,447,494; 4,961,992; 5,019,447; and 5,057,177, incorporated herein by reference.

Known vinyl alcohol-based coatings, such as PVOH and EVOH, that are suitable for use with the multi-layer films invention include VINOL 125 or VINOL 325 (both commercially available from Air Products, Inc.). Other PVOH coatings are described in U.S. Pat. No. 5,230,963, incorporated herein by reference.

Film Orientation

The forms of this invention include possible uniaxial or more preferably biaxial orientation of the multi-layer films. Orientation in the direction of extrusion is known as machine direction orientation (MD), orientation perpendicular to direction of extrusion is known as transverse direction (TD). Orientation may be accomplished by stretching or pulling a blown film in the MD, using a blow-up ratio to accomplish TD orientation. Blown films or cast films may also be oriented by a tenter-frame orientation subsequent to the film extrusion process, again in one or both directions. Orientation may be sequential or simultaneous, depending upon the desired film features. Orientation ratios may generally be in the range of 1:3-1:6 in the machine direction (MD) or 1:4-1:10 in the transverse direction (TD). Preferred orientation ratios are commonly from between about three to about six times the extruded width in the machine direction and between about four to about ten times the extruded width in the transverse direction.

Surface Treatment

One or more of the surfaces of the outer layers of the multi-layer films of this invention may be surface-treated to increase the surface energy to render the film receptive to metallization, coatings, printing inks, and/or lamination. The surface treatment can be carried out according to one of the methods known in the art. Methods include corona discharge, flame, plasma, chemical treatment, or treatment by means of a polarized flame.

Metallization

The exterior surface of one or more of the outer skin layers and/or the sealant layer (or the core layer if no outer skin layer is present) may be metallized. Such layers may be metallized using conventional methods, such as vacuum metallization by deposition of a metal layer such as aluminum, copper, silver, chromium, or mixtures thereof.

Other Additives

Other additives that may be added to the multi-layer films of this invention, include, but are not limited to, pigments, colorants, anti-oxidants, anti-ozonants, anti-fogs, anti-stats, fillers such as diatomaceous earth, combinations thereof, and the like. Such additives may be used in effective amounts, which vary depending upon the property required, and are typically selected from one or more of anti-block, slip additive, anti-oxidant additive, moisture barrier additive or gas barrier additive.

Useful anti-static additives that may be used in amounts ranging from about 0.05 wt % to 3 wt %, based upon the weight of the layer, include alkali metal sulfonates, polyether-modified polydiorganosiloxanes, polyalkylphenylsiloxanes, and tertiary amines.

Anti-blocking agents, such as a silica-based product, such as Sylobloc 44 (commercially available from Grace Davison Products); polymethyl methacrylate (PMMA) particles, such as EPOSTAR™; or polysiloxanes, such as TOSPEARL™; are also contemplated.

The sealant layer and/or the outer skin layer may also include a non-migratory slip agent, such as polymethyl methacrylate (PMMA). The non-migratory slip agent may have a (mean) particle size in the range of from about 0.5 μm to about 13 μm, or more preferably from about 0.5 μm to about 10 μm, or from about 1 μm to about 5 μm, or from about 2 μm to about 4 μm, depending upon layer thickness and desired slip properties. Alternatively, the size of the particles in the non-migratory slip agent, such as PMMA, may be greater than 20% of the thickness of the sealant or outer skin layer containing the slip agent, or greater than 40% of the thickness of the layer, or greater than 50% of the thickness of the layer. In preferred embodiments, the size of the particles is larger than the layer thickness (e.g., about 110% to about 750%, preferably about 400% to about 600%, of the layer thickness). Generally spherical, particulate non-migratory slip additives are contemplated, including PMMA resins, such as EPOSTAR™, manufactured by Nippon Shokubai Co., Ltd. Other commercial sources of suitable materials are also known to exist. Non-migratory means that these particulates do not generally change location throughout the layers of the film in the manner of the migratory slip agents.

A conventional polydialkyl siloxane, such as silicone oil or gum additive, having a viscosity of 10,000 to 2,000,000 centistokes, is also contemplated.

Useful anti-oxidants are phenolic anti-oxidants, such as Irganox 1010 (commercially available from Ciba-Geigy Company). Such anti-oxidants are generally used in amounts ranging from 0.1 wt % to 2 wt %, based on the total weight of the layer to which it is added.

Barrier additives may be used in effective amounts and may include low-molecular weight resins, hydrocarbon resins, particularly petroleum resins, styrene resins, cyclopentadiene resins, and terpene resins.

Optionally, the skin layers may be compounded with a wax or coated with a wax-containing coating, for lubricity, in amounts ranging from 2 wt % to 15 wt % based on the total weight of the layer to which it is added. Any conventional wax, such as, but not limited to, Carnauba™ wax (available from Michelman Corporation, Cincinnati, Ohio) that is useful in thermoplastic films is contemplated.

Substrate

A substrate is adhered to the surface of the multi-layer film opposite the sealant layer. Exemplary substrates include cellulosic and synthetic polymer materials. Exemplary cellulosic materials include, e.g., numerous varieties of paper such as corrugated paperboard, craft paper, glassine, and cartonboard. Exemplary polymeric substrate materials include nonwoven tissue, e.g., spunbonded polyolefin fiber, melt-blown microfibers, etc. In some embodiments, the polymeric material is an oriented film comprising polypropylene or polyester. Particular polymeric films include a polyester having a melting point of 175° C. to 200° C. Some embodiments may employ a suitable adhesive to bond the multi-layer film to the substrate. Thus, in some embodiments, the multi-layer film or the substrate includes an adhesive layer to form the surface contact between the multi-layer polymeric film and the substrate. Exemplary adhesives include hot melt adhesives, e.g., low density polyethylene, ethylene-methacrylate copolymers, polyvinylidene chloride latexes, polyurethanes, and acrylic coatings.

Heat Seals

Heat seals useful in packaging are commonly lap, fin, or crimp seals. Most frequently, vertical form fill and seal and/or horizontal form fill and seal (VFFS and/or HFFS, respectively) useful in snack packaging will employ a fin seal and two crimp seals. For extended shelf life, a hermetic seal is desirable. A hermetic seal is generally one that does not permit the passage of a gas.

Methods and Uses

Multi-layer films disclosed herein are useful as substantially stand-alone film webs or they may be coated, metallized, and/or laminated to other film structures. Multi-layer films disclosed herein may be prepared by any suitable methods that comprise the steps of co-extruding a multi-layer film according to the description and claims of this specification, orienting and preparing the film for intended use such as by coating, printing, slitting, or other converting methods. Preferred methods comprise co-extruding, then casting and orienting, or blowing a five-layer film, such as illustrated and discussed in the examples and in this specification.

In one form, a method of preparing a multi-layer film is provided. The method comprises the step of co-extruding a core layer having a first surface and a second surface, the core layer comprising a core polymer, a first tie layer having a first surface and a second surface, the second surface of the first tie layer adjacent the first surface of the core layer, the first tie layer comprising a soft polymer and a sealant layer adjacent the first surface of the first tie layer, the sealant layer comprising an anti-blocking agent and having a 45° surface gloss of ≤75%, wherein a top seal and/or side seal of the sealant layer to itself has a seal strength of greater than about $20.0 \times 10^2$ grams per inch at 177° C.

In another form, a method of preparing a multi-layer film is provided. The method comprises the step co-extruding at least a core layer having a first surface and a second surface, the core layer comprising a core polymer, a first polymeric tie layer having a first surface and a second surface, the second surface of the first tie layer adjacent the first surface of the core layer, the first tie layer and a polymeric sealant layer adjacent the first surface of the first tie layer, the sealant layer having a 45° surface gloss of ≤75%, enclosing a product or article within at least a portion of the co-extruded film, engaging a first portion of the sealant skin layer with a second portion of the sealant skin layer at a seal layer and applying pressure and heat at the seal area to cause the first portion to engage with the second portion to create at least top seal and/or side seal, the top seal and/or side seal of the sealant layer to itself has a seal strength of greater than about $20.0 \times 10^2$ grams per inch at 177° C.

The prepared multi-layer film may be used as a flexible packaging film, such as to package an article or good, such as a food item or other product. In some applications, the film may be formed into a pouch type of package, such as may be useful for packaging a beverage, liquid, granular, or dry-powder product.

Property Measurements

Seal strength is a measure of the force required to separate a test strip of a material containing a seal and identifies the mode of failure of the test strip. The seal strength is performed on an untreated surface that is sealed to itself.

Minimum seal temperature (MST) is a measure of the sealing property of a film and is the temperature at which a heat seal may support a given force. The seal range is the maximum temperature that the structure seals prior to severe distortion due to sealing heat, minus the MST.

Gloss is a measure of the luster of a surface. The film to be measured is put on a black background. An incident light beam strikes the surface of the film at a 45° angle. A sensor measures the amount of light that is reflected by the film. The gloss is the ratio of the reflected light to the incident light expressed in a percentage. A BYK Gardner Mini-gloss 45° is one instrument used to measure gloss.

Testing Methods

The kinetic coefficient of friction ("COF") was determined according to ASTM 1895 with 25 seconds of measuring time using a TMI Model 32-06 lab slip and friction testing equipment (commercially available from Testing Machines Inc. of Ronkonkoma, N.Y.). A 200 g sled comprised of 3/16 inch sponge rubber with 17 to 24 psi compressibility, is preferred.

The surface roughness (Ra) of the film samples were measured using a surface profilometer (Mahr Federal Perthometer M2 with PFM Drive Unit) according to ISO 4287. The film sample to be tested should be wrinkle and contamination free. Multiple locations are measured across the sample in the TD. The pick-up (stylus) is placed in the measuring position. The tracing-arm is placed on the sample so that the stylus pulls across the TD of the sample surface to be measured. Testing is performed from the right edge of the film surface to center to left edge of the film, in order to prevent contamination of the testing area from the stylus. The Ra value is the arithmetic average of the absolute values of the roughness profile ordinates of the film's surface.

The Mahr Federal Perthometer was also used to determine the peak count (Pc) of the film. The peak count is a unitless measure of the number of roughness profile elements per one inch (2.54 cm) of film. Even though the stylus will travel over a shorter distance, the instrument uses a ratio-and-proportion algorithm to determine what the counts would be over one inch (2.54 cm). In order to determine the peak count, a bandwith of ±0.51 µm was used for the bandwidth that is symmetrical about the mean line for a total bandwith of 1.02 µm. To be counted as a peak, the peak and valley combination must pass through both the top and bottom of this bandwith.

The hermetic operating window (range) and seal strength may be determined using devices such as a Hayssen™ Ultimata II VFFS machine (commercially available from Hayssen Packaging Technologies) at the speed of 55 bags/min. In the examples, the multi-layer films were extrusion laminated on the outside of a 17 to 18 µm biaxially oriented polypropylene film (17 ML 400 or 70 LCX). Empty bags measuring approximately 35.6 cm by 13.3 cm were filled with air and sealed at specified temperatures for lap and/or fin seals at the back of the bag and crimp seal on both ends of the bag. Twenty bags were put under water at 20.3 cmHg vacuum for 60 seconds. If no bubbles were observed from all 20 of the submersed bags, the seal was considered a hermetic seal under the test conditions. If even one of the twenty bags bubbled, the seal was not hermetic. The temperature settings were modified incrementally and the test is repeated until the hermetic area is determined Test results are recorded on a graph with tested crimp seal temperatures on the x-axis in increasing increments of 10° F. (12.2° C.) and lap seal temperatures on the y-axis in increasing increments of 10° F. (12.2° C.). The graph is proportionally divided into contiguous, non-overlapping boxes (cells). Each test resulting in a hermetic seal is represented by a shaded cell on the graph corresponding to the lap and/or fin seal and crimp seal temperature settings. The final hermetic operating window is determined by calculating the total of all filled cells on the graph.

The top seal and side seal ranges are measured on pouches made on Bartelt-Klochner 4-sided pouch machine. Gusseted pouches of 13.3 cm long by 14.0 cm wide are produced at temperatures in increments of 10° F. (12.2° C.). The machine speed is set to 72 pouches per minute. From the end and side seals, 2.5 cm wide strips are cut. The seal strengths are measured using an Alfed-Suter seal strength test machine. The minimum seal temperature for the top and side seals are determined when the seal strength exceeds 200 g/25 mm. The maximum sealing temperature for the test is determined at the point where the sealing heat distorts the lamination beyond the point where a seal can be measured. The range is the difference between the maximum sealing temperature and the minimum sealing temperature.

Particular Embodiments

1. Embodiments of the invention include a multi-layer laminated structure, comprising: (a) a multi-layer polymeric film, comprising: i) a Layer A comprising at least one polymer and having a first surface and a second surface, and ii) a polymeric sealant layer adjacent the first surface of the Layer A, the sealant layer having a surface roughness, Ra,>5.0 and a Peak Count Value, Pc>50.0; and (b) a substrate in surface contact with the multi-layer polymeric film; wherein a top seal and/or side seal of the polymeric sealant layer to itself has a seal strength of >5.00×10$^2$ grams/inch at 177° C.

2. Embodiments of the invention include those of paragraph 1, wherein Layer A comprises a core layer having a first surface and a second surface, the core layer comprising a core polymer; and a first polymeric tie layer having a first surface and a second surface, the second surface of the first tie layer adjacent the first surface of the core layer.

3. In some embodiments of the invention of any preceding paragraphs 1 or 2, the Layer A, particularly in a first tie layer, comprises a soft polymer and the seal strength is greater than about 20.0×10$^2$ grams/inch at 177° C.

4. In some embodiments of the invention of any preceding paragraphs 1 to 3, the polymeric sealant layer comprises a blend of polyethylene and a second polymer selected from the group consisting of ethylene-propylene-butylene terpolymer, and/or a propylene butylene copolymer and/or ethylene-propylene copolymer and combinations thereof.

5. In some embodiments of the invention of any preceding paragraphs 1 to 4, the sealant layer comprises a ethylene-propylene-butylene terpolymer.

6. In some embodiments of the invention of any preceding paragraphs 1 to 5, the sealant layer comprises from about 1.00×10$^3$ ppm to about 1.00×10$^4$ ppm of an anti-blocking agent. Particular antiblocking agents comprise particles having a mean largest dimension ranging from about 1.0 µm to about 10.0 µm.

7. In some embodiments of the invention of any preceding paragraphs 1 to 6, the sealant layer comprises a blend of from about 25 wt % to about 75 wt % polyethylene and from about 25 wt % to about 75 wt % of the second polymer.

8. In some embodiments of the invention of any preceding paragraphs 1 to 7, the sealant layer comprises a blend of from about 25 wt % to about 50 wt % polyethylene and from about 75 wt % to about 50 wt % ethylene-propylene-butylene terpolymer.

9. In some embodiments of the invention of any preceding paragraphs 1 to 8, the Layer A, particularly the core layer comprises a high crystallinity polypropylene having an isotacticity expressed in mmmm pentads of at least 97%, as measured by 13C-NMR.

10. In some embodiments of the invention of any preceding paragraphs 1 to 9, the Layer A, particularly the tie layer includes a soft polymer having a flexural modulus of ≤ about 60 kpsi.

11. In some embodiments of the invention of any preceding paragraphs 1 to 10, the sealant layer has a thickness ranging from about 0.5 µm to about 5 µm, preferably from about 1.0 µm to about 3.0 µm.

12. In some embodiments of the invention of any preceding paragraphs 1 to 11, the top seal and/or side seal of the sealant layer to itself has a seal strength of >20.0×10$^2$ grams per inch at 177° C.

13. In some embodiments of the invention of any preceding paragraphs 1 to 12, the sealant layer has a surface roughness of >15.0 and a Peak Count value of >150.0, particularly a surface roughness of Ra>10.0 and Pc>100.0, more particularly a surface roughness of Ra>7.0 and Pc>50.0, or a surface roughness of Ra>10.0 and Pc>50.0, the surface roughness effective to substantially prevent blocking.

14. In some embodiments of the invention of any preceding paragraphs 1 to 13, the multi-layer film has a kinetic coefficient of friction of <1.0, preferably <0.60.

15. In some embodiments of the invention of any preceding paragraphs 1 to 14, the Layer A further comprises a metallizable layer having a first side and a second side, particularly where Layer A includes a core layer and the first side of the metallizable layer is adjacent the second side of the core layer, and a metal layer adjacent the second side of the metallizable layer.

16. In some embodiments of the invention of any preceding paragraphs 1 to 15, the Layer A, particularly a core layer and/or a first tie layer of Layer A, comprises at least one additive selected from the group consisting of an opacifying agent selected from the group consisting of iron oxide, carbon black, alumina, titanium dioxide ($TiO_2$), talc, and combinations thereof; a void-initiating particle selected from the group consisting of polybutylene terephthalate, calcium carbonate ($CaCO_3$), and combinations thereof; and a hydrocarbon resin, the hydrocarbon resin comprising petroleum resin, terpene resin, styrene resin, cyclopentadiene resin, saturated alicyclic resin, and combinations thereof, the resin having a number average molecular weight of less than 5000, the resin having a softening point in the range of from 60° C. to 180° C.

17. In some embodiments of the invention of any preceding paragraphs 1 to 16, the substrate is a cellulosic or polymeric material, wherein the polymeric material is an oriented film comprising polypropylene or polyester, e.g., a polyester having a melting point of 175° C. to 200° C.

18. In some embodiments of the invention of any preceding paragraphs 1 to 17, the multi-layer polymeric film or the substrate includes an adhesive (e.g., polyethylene, polyurethane, or an acrylic coating) layer to form the surface contact between the multi-layer polymeric film and the substrate.

19. In some embodiments of the invention of any preceding paragraphs 1 to 17, the multi-layer laminate structure is a package, e.g., a bag or a pouch.

20. Particular embodiments include a multi-layer laminated structure, comprising: (a) a multi-layer polymeric film, comprising: i) a core layer having a first surface and a second surface, the core layer comprising a core polymer, ii) a first tie layer having a first surface and a second surface, the second surface of the first tie layer adjacent the first surface of the core layer, the first tie layer comprising a soft polymer, and iii) a sealant layer adjacent the first surface of the first tie layer, the sealant layer comprising antiblock particles and a blend of from about 25% to about 50% polyethylene and from about 75% to about 50% ethylene-propylene-butylene terpolymer; and b) a substrate in surface contact with the multi-layer polymeric film, wherein a top seal and/or side seal of the sealant layer to itself has a seal strength of greater than about $20.0 \times 10^2$, particularly greater than about $25.0 \times 10^2$, grams per inch at 177° C.

21. The multi-layer laminated structure of some embodiments of paragraph 20 has a surface roughness of Ra>10.0 and Pc>50.0, the surface roughness effective to substantially prevent blocking and/or a kinetic coefficient of friction of <0.60.

22. Embodiments of the invention include the multi-layer laminated structure paragraphs 20 and 21, wherein the second surface of the core layer has thereon an adhesion promoting layer, wherein the adhesion promoting layer is metallized, particularly where the second surface of the core layer is metallized by vacuum deposition of a metal selected from the group consisting of aluminum, copper, silver, chromium, and mixtures thereof.

23. Particular embodiments of the invention include a multi-layer laminated structure, comprising: (a) a multi-layer polymeric film, comprising: i) a Layer A having a first surface and a second surface and comprising ≤30.0 wt % of an impact copolymer, and ii) a polymeric sealant layer in surface contact with the first surface of the Layer A and comprising an incompatible blend of: 1) 50.0 wt % to 99.9 wt % of a incompatible blend comprising a soft polymer and a polyethylene homopolymer or copolymer having a density of at least 0.91 g/cm³, and 2) 0.1 wt % to 50.0 wt % of an antiblock; and (b) a substrate in surface contact with the multi-layer polymeric film.

24. Paragraph 23 includes embodiments, wherein the incompatible blend comprises 25.0 wt % to 75.0 wt % of at least a first propylene-based terpolymer comprising a comprising units derived from ethylene and butene, and 25.0% to 75.0% polyethylene having a density of 0.940 g/cm³ to about 0.970 g/cm³ and a melting point of in the range of about 115° C. to about 140° C.

25. Paragraphs 23 and 24 include embodiments, wherein a top seal and/or side seal of the polymeric sealant layer to itself has a seal strength of >$5.00 \times 10^2$ grams/inch at 177° C.

26. Paragraphs 23 to 25 include embodiments, wherein the polymeric sealant layer has a surface roughness, Ra>5.0 and a Peak Count Value, Pc>50.0.

27. Paragraphs 23 to 26 include embodiments, wherein the Layer A comprises: i) a polymeric core layer having a first surface and a second surface; and ii) a first tie layer having a first surface and a second surface, the second surface of the first tie layer adjacent the first surface of the core layer; wherein at least a portion of the first tie layer comprises the first surface of the Layer A, and wherein the tie layer comprises the impact copolymer.

28. Paragraphs 23 to 27 include embodiments, wherein the incompatible blend comprises from 15 wt % to 50 wt % of a second propylene based terpolymer comprising units derived from ethylene and butene and having a different content of units derived from ethylene and/or butene than the first propylene-based terpolymer.

29. Paragraphs 23 to 28 include embodiments, wherein the Layer A, particularly a tie layer portion of Layer A comprises ≥50.0 wt %, ≥60.0 wt %, ≥65.0 wt %, ≥70.0 wt %, ≥75.0 wt %, ≥80.0 wt %, ≥85.0 wt %, ≥90.0 wt %, ≥95.0 wt %, or ≥99.0 wt % of the impact copolymer. The upper limit of the range of impact copolymer content in some embodiments is 55.0 wt %, 60.0 wt %, 65.0 wt %, 70.0 wt %, 75.0 wt %, 80.0 wt %, 85.0 wt %, 90.0 wt %, 95.0 wt %, 99.0 wt %, or 99.5 wt %.

30. Particular embodiments include methods of preparing a multi-layer laminated structure capable of providing a top seal and/or side seal formed by sealing a sealant layer to itself has a seal strength of >$20.0 \times 10^2$ grams per inch at 177° C., the method comprising: (a) forming a multi-layer polymeric film by co-extruding: i) a core layer having a first surface and a second surface, the core layer comprising a core polymer, ii) a first tie layer having a first surface and a second surface, the second surface of the first tie layer adjacent the first surface of the core layer, the first tie layer comprising a soft polymer, and iii) a sealant layer adjacent the first surface of the first tie layer, the sealant layer comprising an anti-blocking agent and having a surface roughness, Ra>5.0 and a Peak Count Value, Pc>50; and (b) laminating a substrate to the multi-layer film.

31. Particular embodiments include methods of using a multi-layer film, comprising the steps of: (a) enclosing a product or article within at least a portion of a co-extruded film, wherein the co-extruded film comprises: (i) a core layer having a first surface and a second surface, the core layer comprising a core polymer, (ii) a first polymeric tie layer having a first surface and a second surface, the second surface of the first tie layer adjacent the first surface of the core layer, the first tie layer, and (iii) a polymeric sealant layer adjacent the first surface of the first tie layer, the sealant layer having a 45° surface gloss of ≤75%; (b) engaging a first portion of the sealant skin layer with a second portion of the sealant skin layer at a seal layer region; and (c) applying pressure and heat at the seal region to cause the first portion to engage with the second portion to create at least a top seal and/or side seal having a seal strength of greater than about $20.0 \times 10^2$ grams per inch at 177° C.

EXPERIMENTAL

The multi-layer film of the present invention will be further described with reference to the following non-limiting examples. All weight percentages specified herein are based on the weight of the respective film layer, unless specified otherwise.

COMPARATIVE EXAMPLES 1-9

Example 1

A five-layer film having an A/B/C/D/E structure is prepared. The A layer is a sealant layer (2.0 μm) comprising 99.5 wt % of an EPB terpolymer (Chisso XPM7794 from Chisso Company) and 0.5 wt % of a crosslinked polymethyl methacrylate antiblocking agent (Epostar MA1010 from Nippon Shokubai). The B layer is a tie layer (5.0 μm) comprising 100 wt % of an isotactic polypropylene (XOM-4612 from ExxonMobil Chemical Company). The C layer is a core layer (17.25 μm) comprising a high crystalline polypropylene (HCPP) (Total 3270 from Total Petrochemicals Company). The D layer is a metallizable skin layer (0.75 μm) comprising 100 wt % of an EPB terpolymer (Borseal™ TD908BF from Borealis). The metallizable skin layer is flame treated during orientation and aluminum (2.8 O.D.) is vacuum deposited to form an E layer. The D layer is plasma treated during the metallization process. The 5-layer film is extrusion laminated to adhere Layer E to 32 lb. paper substrate with a polyethylene adhesive (8.6 lb./ream) for testing of the seal strength using the Bartelt-Klochner 4-sided pouch machine. Test results for the film of Example 1 are presented in Table 1.

Example 2

A five-layer film having an A/B/C/D/E structure is prepared in substantially the same manner as Example 1 that the B layer is a tie layer (5.0 μm) comprising 100 wt % of an impact copolymer (Adflex T100F from Basell). Test results for the film of Example 2 are presented in Table 1.

Example 3

A five-layer film having an A/B/C/D/E structure is prepared in substantially the same manner as Example 1, except that the sealant layer A is comprises 98 wt % of the EPB terpolymer (Chisso XPM7794 from Chisso Company) and 2.0 wt % of the crosslinked polymethyl methacrylate antiblocking agent (Epostar MA1010 from Nippon Shokubai). The B layer is a tie layer (5.0 μm) comprising 100 wt % of an impact copolymer (Adflex T100F from Basell). The C layer is a core layer (17.25 μm) comprising a high crystalline polypropylene (HCPP) (Total 3270 from Total Petrochemicals Company). Test results for the film of Example 3 are presented in Table 1.

Example 4

A five-layer film having an A/B/C/D/E structure is prepared in substantially the same manner as Example 1, except that the tie layer B comprises 75 wt % of a matte resin (Chisso 3420, available from Chisso Company) and 25 wt % of an impact copolymer (Adflex T100F from Basell). Test results for the film of Example 4 are presented in Table 1.

Example 5

A five-layer film having an A/B/C/D/E structure is prepared in substantially the same manner as Example 1, except that the A layer is a sealant layer (2.0 μm) comprising 100 wt % of a matte resin (Matif 67A from Ampacet Company). The B layer is a tie layer (5.0 μm) comprising 100 wt % of an impact copolymer (Adflex T100F from Basell). Test results for the film of Example 5 are presented in Table 1.

Example 6

A five-layer film having an A/B/C/D/E structure is prepared in substantially the same manner as Example 1, except that the A layer is a sealant layer (2.0 μm) comprising 100 wt % of a matte resin (Chisso 3420, available from Chisso Company). The B layer is a tie layer (5.0 μm) comprising 100 wt % of an impact copolymer (Adflex T100F from Basell). Test results for the film of Example 6 are presented in Table 1.

Example 7

A five-layer film having an A/B/C/D/E structure is prepared in substantially the same manner as Example 1, except that the A layer is a sealant layer (2.0 μm) comprising 100 wt % of a matte resin (Chisso 3140, available from Chisso Company). The B layer is a tie layer (5.0 μm) comprising 100 wt % of an impact copolymer (Adflex T100F from Basell). Test results for the film of Example 7 are presented in Table 1.

Example 8

A five-layer film having an A/B/C/D/E structure is prepared in substantially the same manner as Example 1, except that the A layer is a sealant layer (2.0 μm) comprising 40 wt % of a matte resin (Matif 55 from Ampacet Company), 59.5 wt % of an EPB terpolymer (Chisso XPM7794 from Chisso Company), and 0.5 wt % of a crosslinked polymethyl methacrylate antiblocking agent (Epostar MA1010 from Nippon Shokubai). The B layer is a tie layer (5.0 μm) comprising 100 wt % of an impact copolymer (Adflex T100F from Basell). Test results for the film of Example 8 are presented in Table 1.

Example 9

A five-layer film having an A/B/C/D/E structure is prepared in substantially the same manner as Example 1, except that the A layer is a sealant layer (2.0 μm) comprising 20 wt % of a matte resin (Matif 55 from Ampacet Company), 79.5 wt % of an EPB terpolymer (Chisso XPM7794 from Chisso Company) and 0.5 wt % of a crosslinked polymethyl methacrylate antiblocking agent (Epostar MA1010 from Nippon Shokubai). The B layer is a tie layer (5.0 μm) comprising 100 wt % of an impact copolymer (Adflex T100F from Basell). Test results for the film of Example 9 are presented in Table 1.

EXAMPLES 10-16

Example 10

A five-layer film having an A/B/C/D/E structure is prepared in substantially the same manner as Example 1, except that the A layer is a sealant layer (2.0 µm) comprising 99.5 wt % of a matte resin (Chisso 3140, available from Chisso Company) and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 10 are presented in Table 1.

Example 11

A five-layer film having an A/B/C/D/E structure is prepared in substantially the same manner as Example 1, except that the A layer is a sealant layer (2.0 µm) comprising 99.5 wt % of a matte resin (Chisso 3420, available from Chisso Company) and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 11 are presented in Table 1.

Example 12

A five-layer film having an A/B/C/D/E structure is prepared in substantially the same manner as Example 1, except that the A layer is a sealant layer (2.0 µm) comprising 99.5 wt % of a matte resin (Matif 55 from Ampacet Company) and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 12 are presented in Table 1.

Example 13

A five-layer film having an A/B/C/D/E structure is prepared in substantially the same manner as Example 1, except that the A layer is a sealant layer (2.0 µm) comprising 80.0 wt % of a matte resin (Chisso 3420, available from Chisso Company), 19.5 wt % of an EPB terpolymer (Chisso XPM7794 from Chisso Company), and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 13 are presented in Table 1.

Example 14

A five-layer film having an A/B/C/D/E structure is prepared in substantially the same manner as Example 1, except that the A layer is a sealant layer (2.0 µm) comprising 60.0 wt % of a matte resin (Chisso 3420, available from Chisso Company), 39.5 wt % of an EPB terpolymer (Chisso XPM7794 from Chisso Company), and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 14 are presented in Table 1.

Example 15

A five-layer film having an A/B/C/D/E structure is prepared in substantially the same manner as Example 1, except that the A layer is a sealant layer (2.0 µm) comprising 80.0 wt % of a matte resin (Matif 55 from Ampacet Company), 19.5 wt % of an EPB terpolymer (Chisso XPM7794 from Chisso Company), and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 15 are presented in Table 1.

Example 16

A five-layer film having an A/B/C/D/E structure is prepared in substantially the same manner as Example 1, except that the A layer is a sealant layer (2.0 µm) comprising 60.0 wt % of a matte resin (Matif 55 from Ampacet Company), 39.5 wt % of an EPB terpolymer (Chisso XPM7794 from Chisso Company), and 0.5 wt % of a crosslinked polymethyl methacrylate antiblocking agent (Epostar MA1010 from Nippon Shokubai). The B layer is a tie layer (5.0 µm) comprising 100 wt % of an impact copolymer (Adflex T100F from Basell). Test results for the film of Example 16 are presented in Table 1.

TABLE 1

FILM STRUCTURE AND LAYER COMPOSITION FOR EXAMPLES 1-16

| Example | Skin (D) | Core Layer (C) | Tie Layer (B) | Sealant Layer (A) |
|---|---|---|---|---|
| 1 | TD908BF | XOM-4612 | PP (XOM 4612) | Chisso 7794 + 0.5% MA1010 |
| 2 | TD908BF | XOM-4612 | ICP (Adflex T100F) | Chisso 7794 + 0.5% MA1010 |
| 3 | TD908BF | XOM-4612 | ICP (Adflex T100F) | Chisso 7794 + 2.0% MA1013 |
| 4 | TD908BF | XOM-4612 | +3420 Chisso 75% 25% Adflex T100F | Chisso 7794 + 0.5% MA1010 |
| 5 | TD908BF | XOM-4612 | ICP (Adflex T100F) | 100% Matif 67A |
| 6 | TD908BF | XOM-4612 | ICP (Adflex T100F) | 100% Chisso 3420 |
| 7 | TD908BF | XOM-4612 | ICP (Adflex T100F) | 100% Chisso 3140 |
| 8 | TD908BF | XOM-4612 | ICP (Adflex T100F) | 40% Matif 55 + 59.5% Chisso 7794 + 0.5% MA1010 |
| 9 | TD908BF | XOM-4612 | ICP (Adflex T100F) | 20% Matif 55 + 79.5% Chisso 7794 + 0.5% MA1010 |
| 10 | TD908BF | XOM-4612 | ICP (Adflex T100F) | Chisso 3140 + 0.5% MA1013 |
| 11 | TD908BF | XOM-4612 | ICP (Adflex T100F) | Chisso 3420 + 0.5% MA1013 |
| 12 | TD908BF | XOM-4612 | ICP (Adflex T100F) | Matif 55 + 0.5% MA1013 |
| 13 | TD908BF | XOM-4612 | ICP (Adflex T100F) | 80% Chisso 3420 + 19.5% Chisso 7794 + 0.5% MA1010 |
| 14 | TD908BF | XOM-4612 | ICP (Adflex T100F) | 60% Chisso 3420 + 39.5% Chisso 7794 + 0.5% MA1010 |
| 15 | TD908BF | XOM-4612 | ICP (Adflex T100F) | 80% Matif 55 + 19.5% Chisso 7794 + 0.5% MA1010 |

TABLE 1-continued

FILM STRUCTURE AND LAYER COMPOSITION FOR EXAMPLES 1-16

| Example | Skin (D) | Core Layer (C) | Tie Layer (B) | Sealant Layer (A) |
|---|---|---|---|---|
| 16 | TD908BF | XOM-4612 | ICP (Adflex T100F) | 60% Matif 55 + 39.5% Chisso 7794 + 0.5% MA1010 |

†based on sealant layer to sealant layer friction.
Skin layer (D) is flame treated during orientation and aluminum (2.8 O.D.) vacuum deposited thereto form layer (E).

TABLE 2

FILM PROPERTIES FOR EXAMPLES 1-16

| | | | Kin | | | Extrusion Top Seal | | Extrusion Side Seal | | Herm Range |
|---|---|---|---|---|---|---|---|---|---|---|
| Example | Haze | Gloss | COF† | Ra | Pc | Range (C.) | g/in (350 F.) | Range (C.) | g/in (350 F.) | Boxes |
| 1 | | | 0.44 | 10 | 19 | 73 | 1340 | 89 | 1660 | 0 |
| 2 | 4.6 | 73.2 | 0.78 | 10 | 18 | 106 | 3000+ | 123 | 2440 | 26 |
| 3 | | | 0.47 | 8 | 25 | 95 | 3000+ | 95 | 2720 | n/t |
| 4 | | | 1.01 | 11 | 89 | 84 | 2460 | | 2600 | n/t |
| 5 | | | 0.84 | 12 | 42 | 39 | 3000+ | 67 | 2400 | n/t |
| 6 | 54.5 | 52.2 | 0.74 | 31 | 197 | 84 | 2180 | 89 | 2800 | 12 |
| 7 | | | 0.64 | 28 | 239 | 67 | 2340 | 73 | 2360 | 9 |
| 8 | 16.0 | | 0.64 | 13 | 88 | 95 | 2940 | 123 | 3000+ | 13 |
| 9 | 7.2 | | 0.72 | 8 | 19 | 104 | 2640 | 123 | 2900 | 14 |
| 10 | | | 0.30 | 16 | 152 | 73 | 2980 | 95 | 3000+ | n/t |
| 11 | 49.7 | 52.3 | 0.32 | 16 | 163 | 84 | 2760 | 78 | 2800 | n/t |
| 12 | 50.1 | | 0.50 | 25 | 237 | | 2580 | 101 | 2520 | 11 |
| 13 | 46.9 | 52.4 | 0.48 | 28 | 231 | 89 | 2660 | 106 | 2960 | n/t |
| 14 | 36.5 | 52.7 | 0.48 | 23 | 216 | 89 | 2540 | 106 | 3000+ | n/t |
| 15 | 39.0 | | 0.43 | 21 | 211 | 84 | 2960 | 104 | 2960 | 13 |
| 16 | 30.2 | | 0.49 | 18 | 160 | 89 | 3000+ | 117 | 3000+ | 16 |

†based on sealant layer to sealant layer friction.
Skin layer (D) is flame treated during orientation and aluminum (2.8 O.D.) vacuum deposited thereto form layer (E).

As shown in Table 1, the film structures of Examples 1-16 were varied by varying the polymeric sealant layer and the tie layer under the sealant layer. The base film target properties sought to obtain a kinetic COF (sealant/sealant) <0.6, Ra>10, and Pc>50. The target properties of the extrusion laminations produced to paper include seal strength, which when packaged on a Bartell pouch machine must be at least 2,500 g/in for the side and top seal and must maintain at least 1,300 g/in of seal strength over a 60° C. range.

For the comparative examples, Example 1 demonstrates that without iCP in the tie layer, seal strength is insufficient. Example 2 shows that with iCP in the tie layer and only antiblock in the sealant layer, the seal strength is greatly improved, but the film's roughness and COF are unacceptable. Example 3 demonstrates that the addition of more and larger antiblock particles reduces the COF, but roughness is unacceptable. Example 4 shows that with a matte resin in the tie layer, the roughness is improved, but the COF is too high. Examples 5 to 7 show that using a matte resin, alone, in the sealant skin results in COF values that are too high. Examples 8 and 9 show that using too low of a percentage of the matte resin will result in higher COF and lower roughness.

Examples 10 to 16 represent structures of the type advocated herein. As demonstrated by Examples 10 to 16, the polymeric sealant layer blend may contain 0% to 39.5% of a terpolymer (Chisso 7794), 0.5% of 10 to 13 μm antiblock particles (Epostar MA1010 or MA1013), and 60% to 99.5% of a matte resin (Chisso 3140, Chisso 3420, Matif 55). The tie layer may be 100% soft polymer (Adflex T100F). Note that matte resin components may contain 50% terpolymer and 50% polyethylene. Therefore, as is preferred, after the sealant blend in produced, the level of terpolymer in the sealant layer comprises 50 to 70% terpolymer and 50% to 30% PE; as the level of terpolymer is increased, the level of polyethylene decreased.

Those skilled in the art will appreciate that numerous modifications to these forms may be made without departing from the scope of our invention. For example, while certain film layers are exemplified as being comprised of specific polymer blends and additives, along with certain arrangement of layers within the film, other compositions and arrangements are also contemplated. Additionally, while packaging is discussed as among the uses for forms of our inventive films, other uses, such as labeling and printing, are also contemplated.

To the extent that this description is specific, it is solely for the purpose of illustrating certain forms of the invention and should not be taken as limiting the present inventive concepts to these specific forms. Therefore, the spirit and scope of the appended claims should not be limited to the description of the forms contained herein.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all inventive features which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A mufti-layer laminated structure, comprising:
   (a) a mufti-layer polymeric film, comprising:
      i) a core layer comprising polypropylene and having a first surface and a second surface;
      ii) a sealant layer comprising an incompatible blend adjacent the first surface of the core layer, the sealant layer having a surface roughness, Ra>5.0 and a Peak Count Value, Pc>50.0, the incompatible blend comprising ethylene-propylene-butylene terpolymer with at least polyethylene and having a 45° surface gloss of ≤75% (ASTM-D-523);
      iii) a first tie layer consisting of a soft polymer having a flexural modulus of ≤about 60 kpsi (413 MPa) and having a first surface and a second surface, the second surface of the first tie layer adjacent the first surface of the core layer; and
   (b) a substrate in surface contact with the multi-layer polymeric film, wherein a top seal and/or side seal of the polymeric sealant layer to itself has a seal strength of greater than about $20.0 \times 10^2$ grams/inch at 177° C.

2. The multi-layer laminated structure of claim 1, wherein the first tie layer comprises a soft polymer.

3. The multi-layer laminated structure of claim 1, wherein the sealant layer further comprises from about $1.00 \times 10^3$ ppm to about $1.00 \times 10^4$ ppm of an anti-blocking agent comprising particles having a mean largest dimension ranging from about 1.0 to about 10.0 μm.

4. The mufti-layer film of claim 1, wherein the sealant layer comprises a blend of from about 25 wt % to about 50 wt % polyethylene and from about 75 wt % to about 50 wt % ethylene-propylene-butylene terpolymer.

5. The mufti-layer laminated structure of claim 1, wherein the core layer comprises a high crystallinity polypropylene having an isotacticity expressed in mmmm pentads of at least 97%, as measured by 13C-NMR.

6. The mufti-layer laminated structure of claim 1, wherein the sealant layer has a thickness ranging from about 0.5 μm to about 5 μm.

7. The mufti-layer laminated structure of claim 1, wherein the sealant layer has a surface roughness of >15.0 and a Peak Count value of >150.0.

8. The mufti-layer laminated structure of claim 1, further comprising a metallizable layer having a first side and a second side, the first side of the metallizable layer being adjacent the second side of the core layer, and a metal layer adjacent the second side of the metallizable layer.

9. The mufti-layer laminated structure of claim 1, wherein the mufti-layer polymeric film or the substrate includes an adhesive layer to form the surface contact between the multi-layer polymeric film and the substrate.

10. The mufti-layer laminated structure of claim 1, wherein the film is formed as a package, bag, or pouch.

11. The mufti-layer laminated structure of claim 1, wherein the sealant layer has a thickness ranging from about 1.0 μm to about 3.0 μm.

12. A method of preparing a mufti-layer laminated structure capable of providing a top seal and/or side seal formed by sealing a sealant layer to itself and having a seal strength of greater than about $20.0 \times 10^2$ grams per inch at 177° C., the method comprising:
    (a) a mufti-layer polymeric film comprising:
       i) a core layer comprising polypropylene and having a first surface and a second surface;
       ii) a matte sealant layer adjacent the first surface of the core layer, the sealant layer having a surface roughness, Ra>5.0 and a Peak Count Value, Pc>50.0, the sealant layer comprising an incompatible blend of an ethylene-propylene-butylene terpolymer with at least polyethylene and having a 45° surface gloss of 75% (ASTM-D-523);
       iii) a first tie layer consisting of a soft polymer having a flexural modulus of ≤about 60 kpsi (413 MPa) and having a first surface and a second surface, the second surface of the first tie layer adjacent the first surface of the core layer; and
    (b) laminating a substrate to the mufti-layer film.

13. A method of using a mufti-layer film, comprising the steps of:
    (a) enclosing a product or article within at least a portion of a co-extruded film, wherein the co-extruded film comprises:
       i) a core layer comprising polypropylene and having a first surface and a second surface;
       ii) a matte sealant layer adjacent the first surface of the core layer, the sealant layer having a surface roughness, Ra>5.0 and a Peak Count Value, Pc>50.0, the sealant layer comprising an incompatible blend of an ethylene-propylene-butylene terpolymer with at least polyethylene, the sealant layer having a 45° surface gloss of 75%;
       iii) a first tie layer consisting of a soft polymer having a flexural modulus of ≤about 60 kpsi (413 MPa) and having a first surface and a second surface, the second surface of the first tie layer adjacent the first surface of the core layer; and
    (b) engaging a first portion of the sealant layer with a second portion of the sealant layer at a seal layer region; and
    (c) applying pressure and heat at the seal layer region to cause the first portion to engage with the second portion to create at least a top seal and/or side seal having a seal strength of greater than about $20.0 \times 10^2$ grams per inch at 177° C.

* * * * *